J. N. MAHONEY.
ELECTRIC BRAKE.
APPLICATION FILED APR. 20, 1908.
1,076,298.
Patented Oct. 21, 1913.
2 SHEETS—SHEET 2.
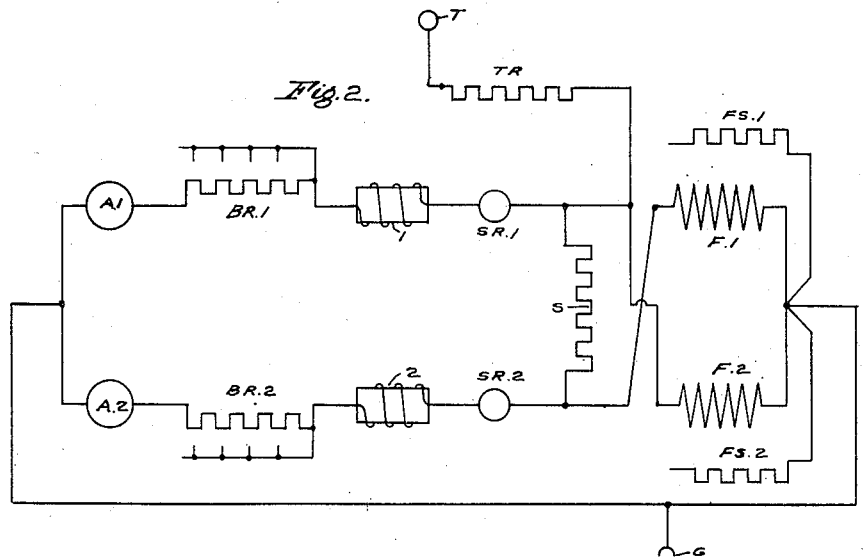
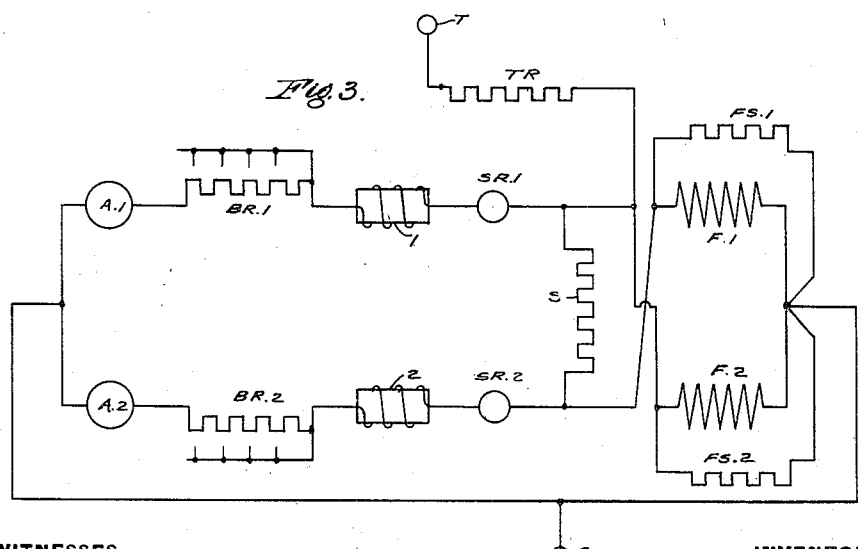
WITNESSES
Wm. M. Cady
J. S. Custer
INVENTOR
Joseph N. Mahoney
by E. Wright
Att'y.

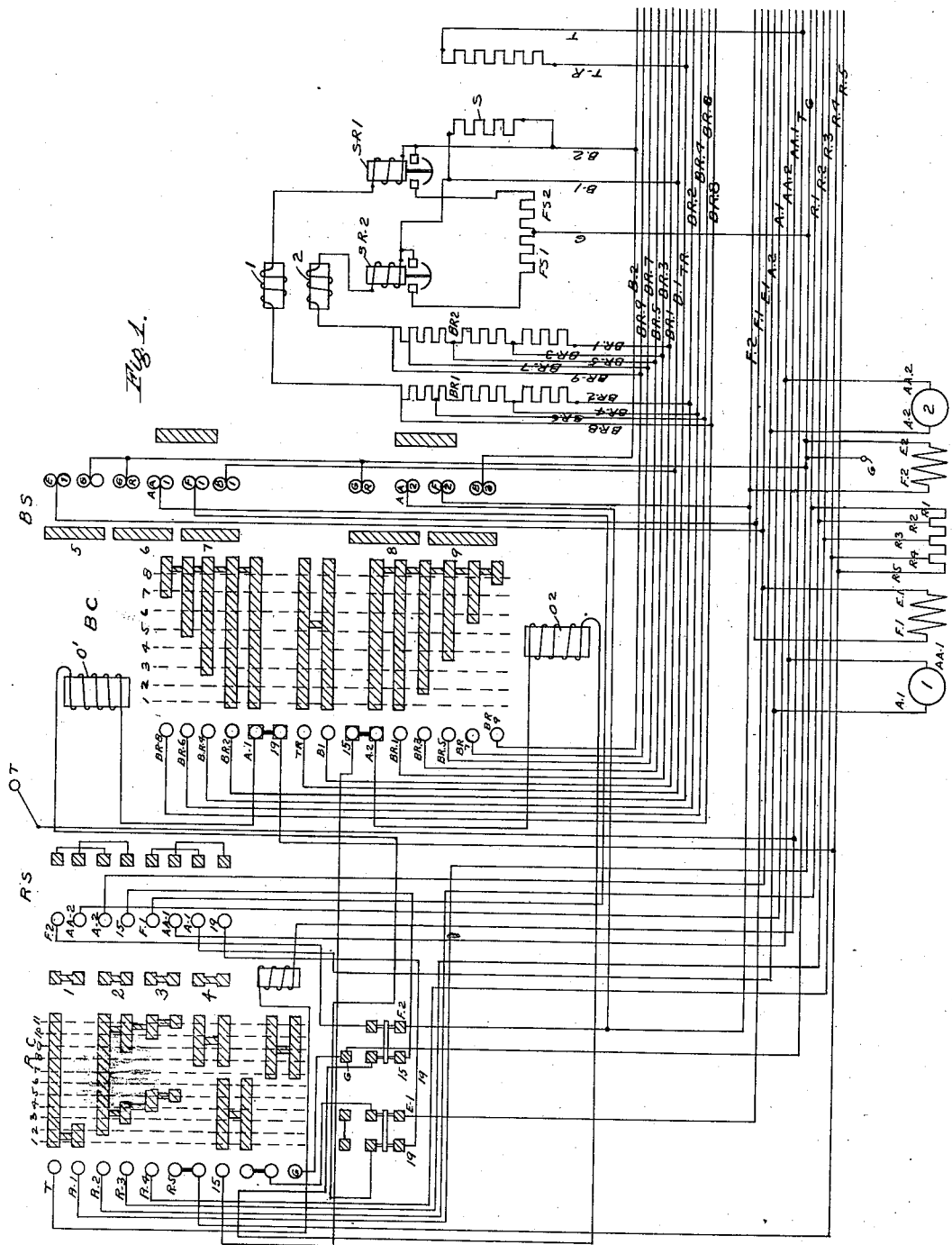

UNITED STATES PATENT OFFICE.

JOSEPH N. MAHONEY, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ELECTRIC BRAKE.

1,076,298. Specification of Letters Patent. Patented Oct. 21, 1913.

Application filed April 20, 1906. Serial No. 428,162.

*To all whom it may concern:*

Be it known that I, JOSEPH N. MAHONEY, a citizen of the United States, residing at Wilkinsburg, in the county of Allegheny and State of Pennsylvania, have invented new and useful Improvements in Electric Brakes, of which the following is a specification.

This invention relates to electric brakes, and more particularly to that type wherein current for applying the brakes is supplied from the car motors connected up to act as generators in a local brake circuit.

In connection with employing the car motors as generators for braking purposes, it has heretofore been proposed to connect up the motors in a circuit, with the armature of each motor cross connected to the field winding of the other motor, so that in case one motor armature should generate current at a greater or less rate than the other the field of the other motor is correspondingly strengthened or weakened and thus any tendency to skid the wheels by the slowing down of the rotating speed of the axle is obviated.

One characteristic of the above arrangement of circuits is that in case the direction of armature rotation is reversed, as sometimes happens where a car starts to move backward down grade, or in case the armature connections are reversed with respect to the fields, as where the reversing switch is thrown in the wrong position, the motor armature having the higher voltage, by reason of the inherent difference in the voltage generated by each one of a plurality of even apparently identical motor generators, will send current in the reverse direction through the other armature and thence by the cross connection through its own field, the direction of current flow being unaltered, so that this motor builds up in the usual manner, and furthermore, causes the reversal of current flow through the other motor so that both motors continue to generate current, but as the motors now generate current in a series circuit, with the brake magnets connected up as heretofore in a local brake circuit branch in parallel with the motor generators, no current would flow in the local brake circuit and consequently no braking action could be obtained.

One object of my invention contemplates
the utilization of the current generated un-
der the above conditions for maintaining the brake applied and for this purpose the invention consists in placing a brake magnet and a variable resistance adapted to be manually controlled in circuit with each armature, then whatever the direction of movement of the car or the position in which the reversing handle is placed, the braking force will still be maintained as the brake coils then receive current in either case, and the braking force may also be varied, by cutting resistance in or out of the circuit in the usual manner.

Another feature of my invention in connection with a braking combination of circuits such as above described, consists in providing means operating upon the failure or breaking of the circuit of one motor to maintain the circuit for the other motor and thereby continue the braking action.
For this purpose a connection of a predetermined resistance is interposed across the armature leads which is of sufficient amount that normally practically no current flows therethrough, but upon the breaking of the one motor circuit, said resistance connection constitutes a path for the current from the active armature to its own field, thereby permitting the continued generation of current and the maintenance of the brake.

In the accompanying drawings; Figure 1 is a diagram illustrating a wiring development and the apparatus for a two motor car equipment, with my improvements applied thereto; Fig. 2 a diagram of circuits as primarily combined in the first braking position of the brake controller; and Fig. 3 a similar diagram of the circuits in the same position of the brake controller but showing the final circuit combination.

As shown in Fig. 1 of the drawings, the apparatus on the car may comprise a series parallel running controller RC of the ordinary construction having a reversing switch RS, and my improved braking controller BC and the running and braking switch BS.

In propelling the car or vehicle, the running controller is moved to its various positions for setting up the different circuit combinations in substantially the same manner as heretofore, and it will therefore be unnecessary to trace the circuits here.

If it is desired to make an application of the brakes, the running controller being in off position, the reversing switch in forward position, and the running and braking switch in the braking position, the braking controller is turned to the first brake notch. The circuits formed in the first braking position may then be traced as follows: Starting with the brush $A^1$ of armature of motor No. 1, the current flows through lead $A^1$, through bar 4 in reversing switch RS to lead 19, blow-out coil $O^1$, point $A^1$ and connecting bars in braking controller BC, lead $BR^2$, brake resistance $BR^1$, brake coil 1, shunt regulator $SR^1$, lead $B^2$, to bar 9 of running and braking switch BS, lead $F^2$ to field coil of motor No. 2, lead $E^2$, bar 5 in switch BS, $E^1$ to field coil motor No. 1, lead $F^1$ to point $F^1$ in BS, bar 7 to point $B^1$, lead $B^1$, shunt regulator $SR^2$, brake coil 2, shunt resistance $BR^2$, lead $BR^1$, to bars in braking controller, lead $A^2$, through blow-out coil $O^2$, to point 15 on reversing switch, through bar 2, to lead $A^2$, and armature of motor No. 2, lead $AA^2$, bar in reversing switch RS, lead $F^2$ to point $AA^2$ in switch BS, bar 8 to point GR and bar 6 to point $AA^1$ thence to point $F^1$ in RS, to bar 3, to point $AA^1$ to lead $AA^1$ and through armature of motor No. 1. The field shunts $FS^1$ and $FS^2$ are controlled by switches operated by the regulator coils $SR^2$ and $SR^1$ respectively, and are connected to a common point located between the field magnet terminals $E^1$ and $E^2$. The trolley is connected through trolley resistance TR to a point in the generator circuit, and a resistance S is connected across the armature leads to the field coils.

The contact bars in the braking controller are arranged to maintain the trolley connection, above referred to, in all positions for braking, for the purpose of supplying current to the motor fields, so as to insure the quick excitation of the fields as soon as the controller is turned to a braking position. This current will also be available for maintaining the brakes applied where the speed of the car is such that insufficient current is generated by the motors to maintain the braking action or where the car has stopped and it is desired to hold the brakes applied, as on a grade, for example.

The diagram shown in Fig. 2 illustrates the above described arrangement of circuits as the controller handle first moves to the braking position, while the diagram shown in Fig. 3 shows the shunt resistances $FS^1$ and $FS^2$ cut in around the field coils of motors No. 1 and 2 respectively, by reason of the current flow through the regulator coils $SR^1$ and $SR^2$ having attained a certain predetermined degree so as to operate their respective shunt controlling switches.

It will now be clear that under the normal conditions the course of the current is from both armatures in parallel through the common return circuit, so that the respective brake magnets 1 and 2 are energized and cause the brakes to be applied, and by varying the resistances $BR^1$ and $BR^2$, in circuit with the respective brake magnets 1 and 2, by the movement of the braking controller to its further positions, the braking force may be graduated as desired. If now the motor connections should be reversed with respect to the direction of movement of the car, as where the reversing switch is moved to the wrong position, or where the car starts to go backward on a grade, then, as well known, the current will cease to flow from the armatures of the motors to the common return circuit, and a series relation will be set up, in which the current from one motor flows through the armature of the other motor. According to my improvements, the brake magnets being disposed in the series circuit thus formed, the brake is maintained, and as in the normal running, the force of brake application may be graduated by varying the resistances $BR^1$ and $BR^2$. Thus, should the motorman not have sufficient presence of mind to first move the braking controller handle to off position and then the reversing switch to the proper position, as was formerly necessary, no harm will be done, as the brake will not be lost.

The safety resistance S is normally inactive and no current flows through the same, but should one motor circuit become broken, a complete motor circuit will still be maintained from the armature in the unimpaired motor circuit through said safety resistance and the field coil corresponding with said armature and the common return circuit, thus setting up a one motor series combination including one of the brake magnets, so that the braking force due to one brake magnet is still effective. The safety resistance S is of sufficient amount so that substantially no current passes through the same when the motor circuits are in normal condition.

Having now described my invention, what I claim as new and desire to secure by Letters Patent, is:—

1. In an electric brake apparatus, the combination with a pair of motors adapted to be connected to act as generators for supplying current to a local brake circuit and having each motor armature connected to the field of a brake magnet device connected in the armature circuit of each motor and the other motor, of means for maintaining the circuit of one motor upon failure of the other motor circuit.

2. In an electric brake apparatus, the combination with a pair of motors adapted to be connected to act as generators for supplying current to a local brake circuit and having each motor armature cross connected to the field of the other motor, of an electrical resistance interposed between each armature and its respective field, for permitting the energization of one field by current from its own armature upon the opening of the circuit of the other motor.

3. In an electric brake apparatus, the combination with a pair of motors adapted to be connected to act as generators for supplying current to a local brake circuit and having each motor armature cross connected to the field of the other motor, of an electrical resistance interposed across the armature leads to the field windings, normally inactive, but adapted upon the breaking of one motor circuit to form a complete circuit for the other motor and thereby maintain braking action.

4. In an electric brake, the combination with a plurality of motors adapted to be connected up to act as generators, of brake magnets and means for connecting one of said brake magnets and a variable resistance in the armature circuit of each generator.

5. In an electric brake, the combination with a plurality of motors adapted to be connected up to act as generators, of a brake magnet adapted to be connected in the armature circuit of each generator, and means for preventing excessive braking action upon reversing the direction of movement of the vehicle.

6. In an electric brake apparatus, the combination with two motors adapted to be connected up to act as generators, of brake magnets, means for connecting one of said brake magnets in series with each motor armature and a variable resistance connected up with each brake magnet and armature.

7. In an electric brake apparatus, the combination with two motors adapted to be connected up to act as generators, of brake magnets and a brake switch or controller for connecting one of said brake magnets and a variable resistance in series with each motor.

8. In an electric brake apparatus, the combination with two motors adapted to be connected up to act as generators for a local brake circuit, of an additional source of current and a braking controller adapted to connect the armature of one motor with the field of another motor and to make connections for supplying current from said source to primarily excite the fields of said motors upon movement of the controller to a braking position.

9. In an electric brake apparatus, the combination with two motors adapted to be connected up to act as generators for a local brake circuit, of an additional source of current and a braking controller having contacts for connecting up the armature of one motor with the field of the other and for making connection from said source of current to a point in the generator circuit located between a motor armature and the field connected thereto.

10. In an electric brake, the combination with a plurality of motors adapted to be connected up to act as generators in a local brake circuit, and a reversing switch, of a brake magnet in the armature circuit of each generator and a variable resistance in each armature circuit, for preventing excessive braking action with the reversing switch in either of its positions irrespective of the direction of movement of the vehicle.

11. In an electric brake, the combination with a plurality of motors and a braking controller adapted to connect up said motors to act as generators in a local brake circuit with the field of one motor cross connected to the armature of the other motor, of an additional source of electric current adapted to supply current to said local brake circuit in all braking positions of said controller.

12. In an electric brake, the combination with two motors adapted to be connected up to act as generators in a local brake circuit, the armature of one motor being connected to the field winding of the other motor, of a brake magnet and a regulating coil in each armature circuit, said regulating coils being adapted to control a shunt resistance around the respective motor fields.

13. In an electric brake apparatus, the combination with two motors adapted to be connected up to act as generators for a local brake circuit, of brake magnets operated by the current in said local brake circuit, regulating coils for controlling a shunt resistance located around each motor field, and a braking controller having a position in which connections are made for cross connecting the armature of one motor to the field of the other motor with a brake magnet and a regulating coil in series with each motor armature.

In testimony whereof I have hereunto set my hand.

JOSEPH N. MAHONEY.

Witnesses:
 R. F. EMERY,
 WM. M. CODY.